(12) United States Patent
Kwalk (10) Patent No.: US 7,193,017 B2
(45) Date of Patent: Mar. 20, 2007

(54) HIGH STRENGTH BIOMODAL POLYETHYLENE COMPOSITIONS

(75) Inventor: Tae Hoon Kwalk, Belle Mead, NJ (US)

(73) Assignee: Univation Technologies, LLC, Houston, TX (US)

( * ) Notice: Subject to any disclaimer, the term of this patent is extended or adjusted under 35 U.S.C. 154(b) by 86 days.

(21) Appl. No.: 10/918,190

(22) Filed: Aug. 13, 2004

(65) Prior Publication Data

US 2006/0036041 A1    Feb. 16, 2006

(51) Int. Cl.
- C08L 23/04    (2006.01)
- C08L 23/06    (2006.01)
- C08L 23/16    (2006.01)
- C08K 5/00    (2006.01)

(52) U.S. Cl. .................. 525/191; 525/240
(58) Field of Classification Search ........... 525/191, 525/240; 526/348, 348.6, 352, 352.2; 524/348, 524/348.6, 352, 352.2, 500, 515
See application file for complete search history.

(56) References Cited

U.S. PATENT DOCUMENTS

| | | | |
|---|---|---|---|
| 3,709,853 A | 1/1973 | Karapinka |
| 4,003,712 A | 1/1977 | Miller |
| 4,011,382 A | 3/1977 | Levine et al. |
| 4,077,904 A | 3/1978 | Noshay et al. |
| 4,115,639 A | 9/1978 | Brown et al. |
| 4,302,565 A | 11/1981 | Goeke et al. |
| 4,302,566 A | 11/1981 | Karol et al. |
| 4,336,352 A | 6/1982 | Sakurai et al. |
| 4,482,687 A | 11/1984 | Noshay et al. |
| 4,543,399 A | 9/1985 | Jenkins, III et al. |
| 4,564,605 A | 1/1986 | Collomb-Ceccarini et al. |
| 4,613,484 A | 9/1986 | Ayres et al. |
| 4,721,763 A | 1/1988 | Bailly et al. |
| 4,879,359 A | 11/1989 | Chamla et al. |
| 4,882,400 A | 11/1989 | Dumain et al. |
| 4,960,741 A | 10/1990 | Bailly et al. |
| RE33,683 E | 9/1991 | Allen et al. |
| 5,091,228 A | 2/1992 | Fujii et al. |
| 5,093,415 A | 3/1992 | Brady, III et al. |
| 5,110,685 A | 5/1992 | Cross et al. |
| 5,208,309 A | 5/1993 | McDaniel et al. |
| 5,274,056 A | 12/1993 | McDaniel et al. |
| 5,283,278 A | 2/1994 | Daire et al. |
| 5,288,933 A | 2/1994 | Kao et al. |
| 5,290,745 A | 3/1994 | Jorgensen et al. |
| 5,318,935 A | 6/1994 | Canich et al. |
| 5,338,589 A | 8/1994 | Bohm et al. |
| 5,344,884 A | 9/1994 | Benham et al. |
| 5,352,749 A | 10/1994 | DeChellis et al. |
| 5,378,764 A | 1/1995 | Benham et al. |
| 5,494,965 A | 2/1996 | Harlin et al. |
| 5,518,973 A | 5/1996 | Miro et al. |
| 5,525,678 A | 6/1996 | Mink et al. |
| 5,541,270 A | 7/1996 | Chinh et al. |
| 5,635,262 A | 6/1997 | Best et al. |
| 5,665,818 A | 9/1997 | Tilston et al. |
| 5,677,375 A | 10/1997 | Rifi et al. |
| 5,739,225 A | 4/1998 | Tazaki et al. |
| 5,795,941 A | 8/1998 | Cree et al. |
| 5,889,128 A | 3/1999 | Schrock et al. |
| 6,090,893 A * | 7/2000 | Harlin et al. ............... 525/240 |
| 6,271,325 B1 | 8/2001 | McConville et al. |
| 6,300,436 B1 | 10/2001 | Agapiou et al. |
| 6,333,389 B2 | 12/2001 | Whiteker et al. |
| 6,340,730 B1 | 1/2002 | Murray et al. |
| 6,344,522 B1 | 2/2002 | Promel |
| 6,359,072 B1 | 3/2002 | Whaley |
| 6,388,017 B1 | 5/2002 | McDaniel et al. |
| 6,388,115 B1 | 5/2002 | Crowther et al. |
| 6,403,717 B1 | 6/2002 | Adams et al. |
| 6,420,580 B1 | 7/2002 | Holtcamp et al. |
| 6,441,096 B1 | 8/2002 | Backman et al. |
| 6,472,484 B1 | 10/2002 | Abe et al. |
| 6,476,166 B1 | 11/2002 | Holtcamp et al. |
| 6,489,427 B1 | 12/2002 | Clutton et al. |
| 6,506,866 B2 | 1/2003 | Jacobsen et al. |
| 6,525,148 B1 | 2/2003 | McDaniel et al. |
| 6,534,604 B2 | 3/2003 | Loveday et al. |
| 6,545,093 B1 | 4/2003 | De Lange et al. |

(Continued)

FOREIGN PATENT DOCUMENTS

BE    839380    3/1977

(Continued)

Primary Examiner—Nathan M. Nutter
(74) Attorney, Agent, or Firm—Kevin M. Faulkner; Leandro Arechederra (57) ABSTRACT

Disclosed are various compositions, including but not limited to a high strength bimodal polyethylene composition having a density of 0.940 g/cc or more, the composition comprising a high molecular weight polyethylene component having a higher weight average molecular weight ($Mw_{HMW}$) and a low molecular weight polyethylene component having a lower weight average molecular weight ($Mw_{LMW}$), wherein: the ratio of the higher weight average molecular weight to the lower weight average molecular weight ($Mw_{HMW}$:$Mw_{LMW}$) is 30 or more; and the composition qualifies as a PE 100 material such that in accordance with ISO 1167 a pipe formed from the composition that is subjected to internal pipe resistance has an extrapolated stress of 10 MPa or more when the internal pipe resistance curve is extrapolated to 50 or 100 years in accordance with ISO 9080:2003(E).

24 Claims, 1 Drawing Sheet

U.S. PATENT DOCUMENTS

| | | |
|---|---|---|
| 6,562,905 B1 | 5/2003 | Nummila-Pakarinen et al. |
| 6,566,450 B2 | 5/2003 | Debras et al. |
| 6,579,922 B2 | 6/2003 | Laurent |
| 6,605,675 B2 | 8/2003 | Mawson et al. |
| 6,608,149 B2 | 8/2003 | Mawson et al. |
| 6,878,454 B1* | 4/2005 | Shannon et al. ............ 428/523 |
| 2004/0034169 A1* | 2/2004 | Zhou et al. ................. 525/240 |
| 2005/0137337 A1* | 6/2005 | Kwalk ....................... 525/191 |

FOREIGN PATENT DOCUMENTS

| | | |
|---|---|---|
| EP | 0 102 503 A2 | 3/1984 |
| EP | 0 103 120 A2 | 3/1984 |
| EP | 0 231 102 A2 | 8/1987 |
| EP | 0 517 868 | 7/1994 |
| EP | 0 703 246 A1 | 3/1996 |
| EP | 0 894 005 | 8/1997 |
| EP | 0 794 200 A2 | 9/1997 |
| EP | 0 802 202 A1 | 10/1997 |
| EP | 0 893 454 A1 | 1/1999 |
| EP | 1 041 113 A1 | 10/2000 |
| EP | 1 146 078 A1 | 10/2001 |
| WO | WO 94/22948 A1 | 10/1994 |
| WO | WO 97/47682 A1 | 12/1997 |
| WO | WO 99/01460 A1 | 1/1999 |
| WO | WO 02/102891 A1 | 12/2002 |
| WO | WO 03/016396 A1 | 2/2003 |

\* cited by examiner

FIG. 1

HIGH STRENGTH BIOMODAL POLYETHYLENE COMPOSITIONS

BACKGROUND

1. Field of Inventions

Embodiments of the present inventions generally relate to compositions containing polyethylene, particularly high strength polyethylene compositions, which are preferably bimodal polyethylene compositions.

2. Description of Related Art

Ongoing efforts have been directed to making pipe compositions, particularly high strength pipe compositions. The goal is for the resin to be made economically and efficiently, but also to provide a pipe with the right balance of properties, e.g., strength and the proper stiffness levels, as well as good processability. Some pipe resin includes polyethylene, which is what the claimed subject matter below relates to.

Certain patents that refer to polyethylene compositions, and methods for making polyethylene, include the following: U.S. Pat. Nos. 4,336,352; 5,091,228; 5,110,685; 5,208,309; 5,274,056; 5,635,262; 5,338,589; 5,344,884; 5,378,764; 5,494,965; 5,739,225; 5,795,941; 6,090,893; 6,340,730; 6,359,072; 6,388,017; 6,388,115; 6,403,717; 6,420,580; 6,441,096; 6,476,166; 6,534,604; 6,562,905; 6,605,675; 6,608,149; and WO 97/47682 and WO 94/22948. Other patents and publications are listed on the cover page of the patent.

SUMMARY

Disclosed herein are various compositions, including a high strength bimodal polyethylene composition having a density of 0.940 g/cc or more, the composition comprising a high molecular weight polyethylene component and a low molecular weight polyethylene component, wherein: the ratio of the weight average molecular weight of high molecular weight component to the weight average molecular weight of low molecular weight component ($Mw_{HMW}$:$Mw_{LMW}$) is 30 or more; and the composition qualifies as a PE 100 material such that in accordance with ISO 1167 a pipe formed from the composition that is subjected to internal pipe resistance has an extrapolated stress of 10 MPa or more when the internal pipe resistance curve is extrapolated to 50 or 100 years in accordance with ISO 9080:2003 (E).

DETAILED DESCRIPTION

Definitions and Properties

Various terms as used herein are defined below. To the extent a term used in a claim is not defined below, or elsewhere herein, it should be given the broadest definition persons in the pertinent art have given that term as reflected in one or more printed publications or issued patents.

For purposes of convenience, various specific test procedures are identified for determining properties such as average molecular weight, extrapolated stress, polydispersity index (PDI), flow index (FI) and melt flow ratio (MFR). However, when a person of ordinary skill reads this patent and wishes to determine whether a composition or polymer has a particular property identified in a claim, then any published or well-recognized method or test procedure can be followed to determine that property (although the specifically identified procedure is preferred, and that any procedure specified in a claim is mandatory, not merely preferred). Each claim should be construed to cover the results of any of such procedures, even to the extent different procedures may yield different results or measurements. Thus, a person of ordinary skill in the art is to expect experimental variations in measured properties that are reflected in the claims. All numerical values can be considered to be "about" or "approximately" the stated value, in view of the nature of testing in general.

Density is a physical property of a composition, is determined in accordance with ASTM-D-1505, and is expressed as grams per cubic centimeter (or grams per milliliter).

Except to the extent the actual density is specified, the term "high density" means any density of 0.940 g/cc or above, alternatively 0.945 g/cc or above, alternatively 0.950 g/cc or above, and alternatively still 0.960 g/cc or above, and an illustrative range of a high density composition is from 0.945 g/cc to 0.967 g/cc.

The term "polyethylene" means a polymer made of at least 50% ethylene-derived units, preferably at least 70% ethylene-derived units, more preferably at least 80% ethylene-derived units, or 90% ethylene-derived units, or 95% ethylene-derived units, or even 100% ethylene-derived units. The polyethylene can thus be a homopolymer or a copolymer, including a terpolymer, having other monomeric units. A polyethylene described herein may, for example, include units derived from a co-monomer that is preferably an α-olefin, e.g., propylene, 1-butene, 1-pentene, 1-hexene, or 1-octene. Other embodiments may include ethacrylate or methacrylate.

The term "composition" (e.g., polyethylene composition) itself broadly means any material that includes polyethylene, and may encompass any blended composition that includes not only the bimodal polyethylene described herein, but also other polymers and optionally additives, e.g., carbon black, and preferably includes additives used in making pipe resin. A composition may be either a "blend" (blended) composition, which can include other polymers, e.g., other polyethylenes or non-polyethylenes, or an "unblended" composition, which does not include other polymers. In certain embodiments, the term "polyethylene composition" consists of the bimodal polyethylene alone, while in other embodiments, the term "polyethylene composition" consists essentially of the bimodal polyethylene, i.e., lacking significant quantities of other materials, e.g., less than 5 wt % of other polymers. However, a composition that includes non-polymer additives such as carbon black is still regarded as a composition consisting essentially of a bimodal polyethylene.

The term "bimodal," when used herein to describe a polymer or polymer composition, e.g., polyethylene, means "bimodal molecular weight distribution," which term is understood as having the broadest definition persons in the pertinent art have given that term as reflected in one or more printed publications or issued patents. At least one example of a bimodal polyethylene is shown herein in FIG. 1, in which the horizontal axis is expressed as the log of the molecular weight (Log MW). For example, a composition that includes a polyethylene component with at least one identifiable higher molecular weight and a polyethylene component with at least one identifiable lower molecular weight, e.g., two peaks (as displayed in FIG. 1), is considered to be a "bimodal" polyethylene, as that term is used herein. A material with more than two different molecular weight distribution peaks will be considered "bimodal" as that term is used herein although the material may also be referred to as a "multimodal" composition, e.g., a trimodal or even tetramodal, etc. composition. As noted below, various different types of processes, and reactor configurations, can be used to produce a bimodal polyethylene composition, including melt blending, series reactors (i.e., sequentially-configured reactors) and single reactors using bimetallic catalyst systems. Any polyethylene composition regarded as a "multi-modal" composition in U.S. Pat. No. 6,579,922 is considered to fall within the broad meaning of the term "bimodal polyethylene composition" herein, although important differences exist between the bimodal compositions claimed herein and the bimodal compositions disclosed in that patent. Thus, for example, one embodiment of bimodal composition is a reactor blend (also sometimes referred to as a chemical blend), is one that is formed (polymerized) in a single reactor, e.g., using a multiple catalyst system (e.g., a dual site catalyst) while at least one other embodiment of a bimodal composition is a physical blend, e.g., a composition formed by the post-polymerization blending or mixing together of two unimodal polyethylene compositions.

The term "multiple-catalyst system" includes any composition, mixture or system that includes at least two different catalyst compounds, each having the same or a different metal group, including a "dual catalyst," e.g., a bimetallic catalyst. Alternatively, each different catalyst compound of the multiple catalyst system resides on a single support particle, e.g., in which case a dual (bimetallic) catalyst is considered to be a supported catalyst. However, the term bimetallic catalyst also broadly includes a system or mixture in which one of the catalysts resides on one collection of support particles, and another catalyst resides on another collection of support particles. Preferably, in that latter instance, the two supported catalysts are introduced to a single reactor, either simultaneously or sequentially, and polymerization is conducted in the presence of the bimetallic catalyst system, i.e., the two collections of supported catalysts. Alternatively, the multiple catalyst system includes a mixture of unsupported catalysts in slurry form.

The term "FI" as used herein means $I_{21}$, which is measured in accordance with ASTM-1238, Condition E, at 190 degrees C.

The term "MFR ($I_{21}/I_2$)" as used herein means the ratio of $I_{21}$ (also referred to as FI) to $I_2$, and both $I_{21}$ and $I_2$ are measured in accordance with ASTM-1238, Condition E, at 190 degrees C.

The term "high strength" as used herein broadly refers to any one or more of a collection of mechanical properties, e.g., strength-related properties, e.g., properties used to characterize resin used in making pipe, particularly resin that would qualify as PE-80 resin, or PE-100 resin, or preferably PE-100+ resin. In at least the preferred embodiment, the high strength polyethylene compositions described herein qualify as a PE 100 material, using any of the tests adopted by industry for qualifying a resin in that manner. Preferably, the polyethylene composition is one that, in accordance with ISO 1167:1996/Cor.1:1997(E) (Technical Corrigendum 1, published 1997-03-01), entitled "Thermoplastics pipes for the conveyance of fluids—Resistance to internal pressure—Test method," a pipe formed from the composition that is subjected to internal pipe resistance at selected temperatures has an extrapolated stress of 10 Mpa or greater when the internal pipe resistance curve is extrapolated to 50 or 100 years in accordance with ISO 9080:2003(E).

Figure 1:
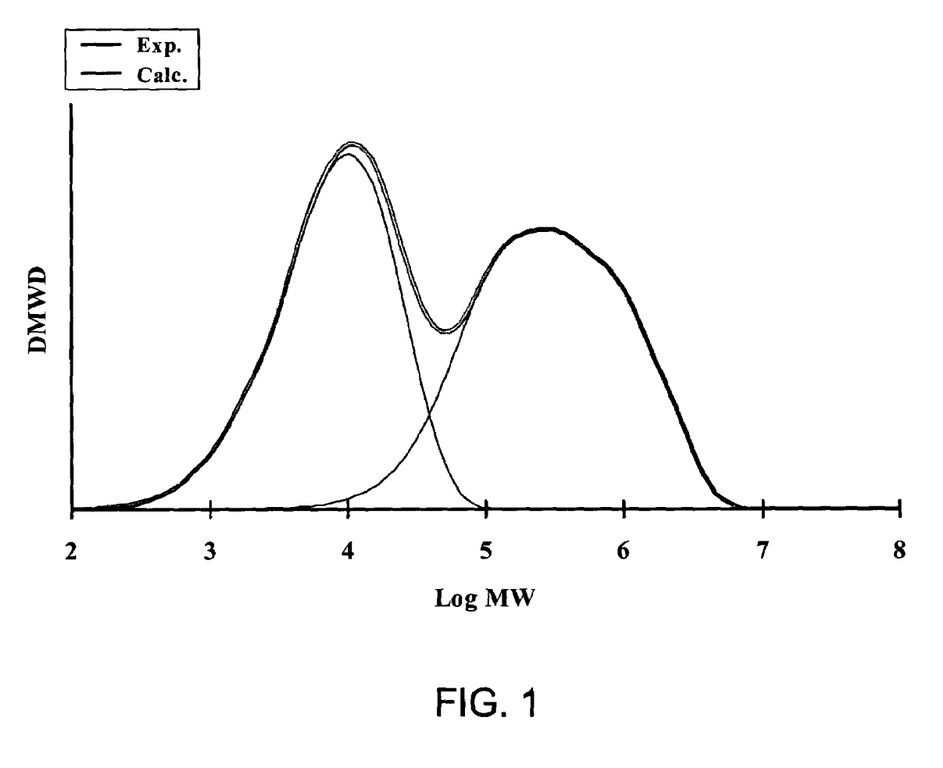
FIG. 1 is an overall molecular weight distribution curve and its individual molecular weight distribution curves of two components after deconvolution.

The term "high molecular weight polyethylene component" as used herein means the polyethylene component in the bimodal composition that has a higher molecular weight than the molecular weight of at least one other polyethylene component in the same composition. Preferably, that polyethylene component has an identifiable peak, e.g., as shown in FIG. 1. When the composition includes more than two components, e.g., a trimodal composition, then the high molecular weight component is to be defined as the component with the highest weight average molecular weight. In certain embodiments, a high molecular weight component is a component forming a part of the bimodal composition that has a weight average molecular weight (Mw) of from 300,000 to 800,000. In different specific embodiments, the average molecular weight of the high molecular weight polyethylene component may range from a low of 200,000, or 250,000, or 300,000, or 350,000, or 400,000, or 450,000, or 500,000, to a high of 1,000,000, or 900,000, or 800,000, or 700,000, or 600,000.

The term "low molecular weight polyethylene component" as used herein means the polyethylene component in the composition that has a lower molecular weight than the molecular weight of at least one other polyethylene component in the same composition. Preferably, that polyethylene component has an identifiable peak, e.g., as shown in FIG. 1. When the composition includes more than two components, e.g., a trimodal composition, then the low molecular weight component is to be defined as the component with the lowest weight average molecular weight. In certain embodiments, a low molecular weight component is a component forming a part of the composition that has a weight average molecular weight (Mw) of from 5,000 to 30,000. In different specific embodiments, the average molecular weight of the low molecular weight component may range from a low of 3,000, or 5,000, or 8,000, or 10,000, or 12,000, or 15,000, to a high of 100,000, or 50,000, or 40,000, or 30,000, or 25,000.

The term "weight average molecular weight" is a term used to describe a bimodal polyethylene described herein, or to describe a high molecular weight polyethylene component, and a low molecular weight polyethylene component. In either case, the term "average molecular weight" broadly refers to any weight average molecular weight (Mw) as measured or calculated according to any published method, which incorporates procedures, equipment and conditions in ASTM D 3536-91 (1991) and ASTM D 5296-92 (1992).

The "overall" number average, weight average, and z-average molecular weight are terms that refer to the molecular weight values for the entire composition, as opposed to that of any individual component. Overall molecular weight values referenced in the claims encompass any value as determined by any published method, including those mentioned in the paragraph above; however, a preferred method is using an SEC curve.

The number average, weight average and z-average molecular weight (particularly the weight average molecular weight) of a particular polyethylene component recited in the claims, e.g., the high molecular weight component and the low molecular weight component, can also be determined any published method, including those mentioned in the paragraphs above; however, a preferred method is using any published deconvolution procedure, e.g., any published technique for elucidating each individual component polymer's molecular information in a bimodal polymer. A particularly preferred technique is one that uses a Flory deconvolution, including but not limited to the Flory procedures set forth in U.S. Pat. No. 6,534,604 which is incorporated by reference in its entirety. Any program that incorporates the principles contained in the following reference is useful: P. J. Flory, Principles of Polymer Chemistry, Cornell University Press, New York 1953. Any computer program capable of fitting an experimental molecular weight distribution with multiple Flory or log-normal statistical distributions is useful. The Flory distribution can be expressed as follows:

$$Y = A_o \left(\frac{M}{M_n}\right)^2 e^{\left(\frac{M}{M_n}\right)}$$

In this equation, Y is the weight fraction of polymer corresponding to the molecular species M, Mn is the number average molecular weight of the distribution, and $A_o$ is the weight fraction of the site generating the distribution. Y can be shown to be proportional to the differential molecular weight distribution (DMWD) which is the change in concentration with the change in log-molecular weight. The SEC chromatogram represents the DMWD. Any computer program that minimizes the square of the difference between the experimental and calculated distributions by varying the $A_o$ and Mn for each Flory distribution is preferred. Particularly preferred is any program that can handle up to 8 Flory distributions. A commercially available program, called Excel Solver, offered by Frontline Systems, Inc. at www-.solver.com can be used to perform the minimization. Using this program, special constraints can be placed on the individual Flory distributions that allow one to fit chromatograms of experimental blends and bimodal distributions.

Bimodal distributions can be fit with two individual groups of four constrained Flory distributions, for a total of eight distributions. One constrained group of four fits the low molecular weight component while the other group fits the high molecular weight component. Each constrained group is characterized by $A_o$ and Mn of the lowest molecular weight component in the group and the ratios $A_o(n)/A_o(1)$ and $Mn(n)/Mn(1)$ for each of the other three distributions (n=2,3,4). Although the total number of degrees of freedom is the same for the constrained fit as for eight unconstrained Flory distributions, the presence of the constraint is needed to more accurately determine the contribution to the total chromatogram of the individual low molecular weight and high molecular weight components in a bimodal polymer. Once the fitting process is complete, the program will then calculate the molecular weight statistics and weight percents of the individual high and low molecular weight components. FIG. 1 depicts a deconvoluted curve of each individual component.

The term "split" is defined herein as the weight % of a high molecular weight component in a bimodal composition. Thus, it describes the relative amount of the high molecular weight component against the low molecular weight component in a bimodal polyethylene composition, including any of the polymer compositions described herein. The weight % of each component can also be represented by the area of each molecular weight distribution curve that is seen after deconvolution of the overall molecular weight distribution curve.

The term "spread" as used herein means the ratio of the weight average molecular weight of the high molecular weight polyethylene component, sometimes referred to as $Mw_{HMW}$, to the weight average molecular weight of the low molecular weight polyethylene component, sometimes referred to as $Mw_{LWM}$. The "spread" can therefore be also expressed as the ratio of $Mw_{HMW}:Mw_{LMW}$. Weight average molecular weight of each component can be obtained by deconvolution of an overall SEC curve, i.e., an SEC curve of an entire composition.

As used herein, the term "PDI" means polydispersity index, and means the same thing as "MWD" (molecular weight distribution), which term is understood as having the broadest definition persons in the pertinent art have given that term as reflected in one or more printed publications or issued patents. The PDI (MWD) is the ratio of weight-average molecular weight (Mw) to number-average molecular weight (Mn), i.e., Mw/Mn.

Specific Embodiments

Various specific embodiments are described below, at least some of which are also recited in the claims.

As noted below, certain properties or features of the compositions or polymers or catalyst systems are expressed in terms of lower limits (e.g., X or greater) or upper limits (e.g., Y or less). It is understood that any of the lower limits can be combined with any of the upper limits, so as to provide a variety of alternate ranges.

For any pipe produced from any one of the high strength bimodal polyethylene compositions disclosed herein, when subjected to full hydrostatic strength testing following ISO 1167, the extrapolated stress can be 10.5 MPa or greater when extrapolated to 50 or 100 years in accordance with ISO 9080:2003(E). Advantageously, a variety of alternate extrapolated stress values are provided. For example, when extrapolated to 50 or 100 years in accordance with ISO 9080:2003(E), the extrapolated stress can be 10.1 MPa or greater, or 10.2 MPa or greater, or 10.3 MPa or greater, or 10.4 MPa or greater, or 10.5 MPa or greater, or 10.6 MPa or greater, or 10.7 MPa or greater, or 10.8 MPa or greater, e.g., up to 15.0 MPa, or any combination of the foregoing upper and lower limits.

In any of the compositions described above or elsewhere herein, the high molecular weight polyethylene component may have a density lower limit of 0.920 g/ml or more, or 0.925 g/ml or more, or 0.930 g/ml or more, with a density upper limit of 0.945 g/ml or less, or 0.940 g/ml or less, or 0.935 g/ml or less.

In any of the compositions described above or elsewhere herein, the low molecular weight polyethylene component may have a density lower limit of 0.940 g/ml or more, or 0.945 g/ml or more, or 0.950 g/ml or more, with a density upper limit of 0.965 g/ml or less, or 0.960 g/ml or less, or 0.955 g/ml or less.

In any of the compositions described above or elsewhere herein, the weight average molecular weight (Mw) of the low molecular weight polyethylene component can be, for example, from 5,000 to 30,000, or any of the ranges spanning between other lower and upper limits disclosed elsewhere herein.

In any of the compositions described above or elsewhere herein, the weight average molecular weight (Mw) of the high molecular weight polyethylene component can be, for example, from 300,000 to 800,000, or any of the ranges spanning between other lower and upper limits disclosed elsewhere herein.

In any of the compositions described above or elsewhere herein, the high molecular weight polyethylene component includes a polyethylene that includes a comonomer selected from the group consisting of butene, hexene and octene, wherein the comonomer is present in the amount of 1.0 wt %, or preferably more than 2.0 wt %, or more preferably, more than 3.0 wt % of the polyethylene.

In any of the compositions described above or elsewhere herein, the low molecular weight polyethylene component can include, for example, a polyethylene that includes a comonomer selected from the group consisting of butene, hexene and octene, wherein the comonomer is present in the amount of 3.0 wt %, or preferably less than 2.0 wt %, or more preferably, less than 1.0 wt % of the polyethylene.

In one or more of the high strength compositions disclosed herein, the weight % of high molecular weight polyethylene component, split, can occupy 50 wt % or more of the composition. In alternate embodiments, the high molecular weight polyethylene component can occupy 55 wt % or more, or 60 wt % or more, of the composition. Conversely, in any of those aforementioned high strength compositions, the high molecular weight polyethylene component can occupy 80 wt % or less of the composition, or 70 wt % or less, or 60 wt % or less, or 50 wt % or less, or any combination of the foregoing upper and lower limits.

In one or more of the high strength compositions disclosed herein, the spread, the ratio of $Mw_{HMW}$:$Mw_{LMW}$ as defined previously, can be 30 or more, or 32 or more, or 35 or more, or 37 or more, or 40 or more, or 45 or more.

In one or more of the high strength compositions disclosed herein, the FI ($I_{21}$) of the composition can range from 5 to 12 g/10 min. In alternate embodiments, the FI can be expressed as having any one of a number of ranges, e.g., with a lower limit of 3 g/10 min. or above, or 7 g/10 min. or above, or 9 g/10 min. or above, or 10 g/10 min. or above; together with an upper limit of 8 g/10 min. or below, or 10 g/10 min. or below, or 12 g/10 min. or below, or 15 g/10 min. or below, or 20 g/10 min. or below, or 25 g/10 min. or below, or any combination of the foregoing upper and lower limits.

In one or more of the high strength compositions disclosed herein, the MFR ($I_{21}/I_2$) can range from 100 to 250. In alternate embodiments, the MFR can be expressed as having any one of a number of ranges, e.g., with a lower limit of 50 (or more), or 60, or 70, or 80, or 90, or 100, or 110, or 120, or 130, or 140, or 150; together with an upper limit of 150, or 180, or 220, or 250, or 270, or 300, or 320, or 350, or any combination of the foregoing upper and lower limits.

In one or more of the high strength compositions disclosed herein, the PDI of the overall composition can be 25 or more. In alternate embodiments, the PDI can be expressed as having any one of a number of ranges, e.g., with a lower limit of 10 or more, or 15 or more, or 20 or more, or 25 or more, or 30 or more, or 35 or more; together with an upper limit of 50 or less, or 45 or less, or 40 or less, or 35 or less, or 30 or less, or any combination of the foregoing upper and lower limits.

In one or more of the high strength compositions disclosed herein, the PDI of the high molecular weight component can be greater than 3.5. In alternate embodiments, the PDI of the high molecular weight component can be expressed as having any one of a number of ranges, e.g., with a lower limit of 2.5 or more, or 3.0 or more, or 3.5 or more, or 3.5 or more, or 4.0 or more, or 4.5 or more, or 6.0 or more, or 8.0 or more, or 10.0 or more; together with an upper limit of 40.0 or less or 35.0 or less, or 30.0 or less, or 25.0 or less, or 20.0 or less, or 15.0 or less, or 10.0 or less, or 8.0 or less, or any combination of the foregoing upper and lower limits.

In one or more of the high strength compositions disclosed herein, the PDI of the low molecular weight component can be 2.5 or more. In alternate embodiments, the PDI of the low molecular weight component can be expressed as having any number of ranges, e.g., with a lower limit of 2.0 or more, or 2.5 or more, or 3.0 or more, or 3.5 or more, or 4.0 or more, or 4.5 or more, or 5.0 or more; together with an upper limit of 20.0 or less, or 15.0 or less, or 10.0 or less, or 8.0 or less, or 6.0 or less, or 5.0 or less, or any combination of the foregoing upper and lower limits.

In one or more of the high strength compositions disclosed herein, the average molecular weight of the overall composition can be 200,000 or more. In alternate embodiments, the average molecular weight of the overall composition can be expressed as having any one of a number of ranges, e.g., with a lower limit of 50,000 or more, or 100,000 or more, or 150,000 or more, or 200,000 or more, or 250,000 or more, or 300,000 or more, or 350,000 or more, or 400,000 or more, or 450,000 or more; together with an upper limit of 1,000,000 or less, or 900,000 or less, or 850,000 or less, or 800,000 or less, or 750,000 or less, or 700,000 or less, or 650,000 or less, or 600,000 or less, or 550,000 or less, or 500,000 or less, or 450,000 or less, or 400,000 or less or any combination of the foregoing upper and lower limits.

In one or more of the high strength compositions disclosed herein, the average molecular weight (Mw) of the low molecular weight component is preferably 5,000 or more; or 8,000 or more; or 10,000 or more; and is preferably 20,000 or less; or 15,000 or less; or 12,000 or less, or ranges represented by any combination of the foregoing upper and lower limits.

In one or more of the high strength compositions disclosed herein, the high and low molecular weight polyethylene components can be formed in a single reactor. Examples of such reactors are disclosed elsewhere herein in greater detail.

In one or more of the high strength compositions disclosed herein, the high and low molecular weight polyethylene components can be formed in gas phase polymerization. Details of useful gas phase polymerizations are described elsewhere herein.

One or more of the high strength compositions disclosed herein can be made from polymerization conducted in the presence of a multiple catalyst system that includes a metallocene based catalyst.

In one or more of the high strength compositions disclosed herein, the high and low molecular weight polyethylene components can be formed from polymerization conducted in the presence of a multiple catalyst system that includes bis(2-(trimethylphenylamido)ethyl)amine zirconium dibenzyl.

In one or more of the high strength compositions disclosed herein, the high and low molecular weight polyethylene components can be formed from polymerization conducted in the presence of a multiple catalyst system that includes bis(2-(pentamethyl-phenylamido) ethyl)amine zirconium dibenzyl.

In one or more of the high strength compositions disclosed herein, the high and low molecular weight polyethylene components can be formed from polymerization conducted in the presence of a multiple catalyst system that includes pentamethylcyclopentadienyl, n-propylcyclopentadienyl zirconium dichloride.

Bimodal Polyethylenes

As noted above, the high strength bimodal polyethylene composition preferably has a density of 0.940 g/cc or more, and includes (and in certain embodiments consists or consists essentially of) a high molecular weight polyethylene component having a higher weight average molecular weight (Mw$_{HMW}$) and a low molecular weight polyethylene component having a lower weight average molecular weight (Mw$_{LMW}$), wherein: the split is higher than 50% and the spread is 30 or more; and the composition qualifies as a PE 100 material such that in accordance with ISO 1167 a pipe formed from the composition that is subjected to internal pipe resistance has an extrapolated stress of 10 MPa or greater when the internal pipe resistance curve is extrapolated to 50 or 100 years in accordance with ISO 9080:2003 (E). As noted in the discussion of the specific embodiments; likewise, the extrapolated stress can be higher, and is preferably 10.5 MPa or higher, and even 10.7 MPa or higher. The spread can also higher than 30, as noted above.

In at least one particular embodiment, a composition includes a bimodal polyethylene prepared using any of the catalyst systems described above but, not limited to those illustrated herein.

As noted above, the bimodal polyethylene compositions preferably have a high molecular weight component and a low molecular weight component. Preferably, the high molecular weight component has a lower density than the density of the low molecular weight component. Also, the high molecular weight component preferably has a higher comonomer content than the comonomer content of the low molecular weight component. The comonomer content can be expressed as the number of comonomer branches per 1000 carbon atoms. In certain embodiments, the number of comonomer branches per 1000 carbon atoms for the low molecular weigh component is between 0 and 2, preferably 1 or less. In certain embodiments, the number of comonomr branches per 1000 carbon atoms for the high molecular weight component is 2 to 5, preferably more than 2, or more preferably, more than 3.

Polymerization Processes

The polymerization process used to form any of the polymers described herein, e.g., either of the polyethylene components used to make the blends, may be carried out using any suitable process, for example, high pressure, solution, slurry and gas phase. Certain polyethylenes can be made using a gas phase polymerization process, e.g., utilizing a fluidized bed reactor. This type reactor and means for operating the reactor are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

A polymerization process may be effected as a continuous gas phase process such as a fluid bed process. A fluid bed reactor may comprise a reaction zone and a so-called velocity reduction zone. The reaction zone may comprise a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

The reactor temperature of the fluid bed process herein preferably ranges from 30° C. or 40° C. or 50° C. to 90° C. or 100° C. or 110° C. or 120° C. or 150° C. In general, the reactor temperature is operated at the highest temperature that is feasible taking into account the sintering temperature of the polymer product within the reactor. Regardless of the process used to make the polyolefins of the invention, the polymerization temperature, or reaction temperature should be below the melting or "sintering" temperature of the polymer to be formed. Thus, the upper temperature limit in one embodiment is the melting temperature of the polyolefin produced in the reactor.

A slurry polymerization process can also be used. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

Also useful is particle form polymerization, a process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and 2 Metallocene-Based Polyolefins 322–332 (2000).

These processes can be used for the production of homopolymers of olefins, particularly ethylene, and/or copolymers, terpolymers, and the like, of olefins, particularly ethylene, and at least one or more other olefin(s). Preferably the olefins are α-olefins. The olefins, for example, may contain from 2 to 16 carbon atoms in one embodiment; and in another embodiment, ethylene and a comonomer comprising from 3 to 12carbon atoms in another embodiment; and ethylene and a comonomer comprising from 4 to 10 carbon atoms in yet another embodiment; and ethylene and a comonomer comprising from 4 to 8 carbon atoms in yet another embodiment. Particularly preferred are polyethylenes. Such polyethylenes are preferably homopolymers of ethylene and interpolymers of ethylene and at least one α-olefin wherein the ethylene content is at least about 50% by weight of the total monomers involved. Exemplary olefins that may be utilized herein are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene or polypropylene, comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 200 atmospheres pressure in yet another embodiment, and up to 100 atmospheres in yet another embodiment, and up to 50 atmospheres in yet another embodiment.

Hydrogen gas is often used in olefin polymerization to control the final properties of the polyolefin, such as described in Polypropylene Handbook 76–78 (Hanser Publishers, 1996). Using certain catalyst systems, increasing concentrations (partial pressures) of hydrogen can increase the melt flow rate (MFR) (also referred to herein as melt index (MI)) of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and hexane or propene. The amount of hydrogen used in the polymerization process of the present invention is an amount necessary to achieve the desired MFR or MI of the final polyolefin resin. In one embodiment, the mole ratio of hydrogen to total monomer ($H_2$:monomer) is in a range of from greater than 0.0001 in one embodiment, and from greater than 0.0005 in another embodiment, and from greater than 0.001 in yet another embodiment, and less than 10 in yet another embodiment, and less than 5 in yet another embodiment, and less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 5000 ppm, and up to 4000 ppm in another embodiment, and up to 3000 ppm in yet another embodiment, and between 50 ppm and 5000 ppm in yet another embodiment, and between 500 ppm and 2000 ppm in another embodiment.

Further, it is common to use a staged reactor employing two or more reactors in series, wherein one reactor may produce, for example, a high molecular weight component and another reactor may produce a low molecular weight component. In one embodiment of the invention, the polyolefin is produced using a staged gas phase reactor. Such commercial polymerization systems are described in, for example, 2 Metallocene-Based Polyolefins 366–378 (John Scheirs & W. Kaminsky, eds. John Wiley & Sons, Ltd. 2000); U.S. Pat. No. 5,665,818, U.S. Pat. No. 5,677,375; U.S. Pat. No. 6,472,484; EP 0 517 868 and EP-A-0 794 200.

The one or more reactor pressures in a gas phase process (either single stage or two or more stages) may vary from 100 psig (690 kPa) to 500 psig (3448 kPa), and in the range of from 200 psig (1379 kPa) to 400 psig (2759 kPa) in another embodiment, and in the range of from 250 psig (1724 kPa) to 350 psig (2414 kPa) in yet another embodiment.

The gas phase reactor employing the catalyst system described herein is capable of producing from 500 lbs of polymer per hour (227 Kg/hr) to 200,000 lbs/hr (90,900 Kg/hr), and greater than 1000 lbs/hr (455 Kg/hr) in another embodiment, and greater than 10,000 lbs/hr (4540 Kg/hr) in yet another embodiment, and greater than 25,000 lbs/hr (11,300 Kg/hr) in yet another embodiment, and greater than 35,000 lbs/hr (15,900 Kg/hr) in yet another embodiment, and greater than 50,000 lbs/hr (22,700 Kg/hr) in yet another embodiment, and from 65,000 lbs/hr (29,000 Kg/hr) to 100,000 lbs/hr (45,500 Kg/hr) in yet another embodiment.

A slurry or gas phase process can be operated in the presence of a bulky ligand metallocene-type catalyst system and in the absence of, or essentially free of, any scavengers, such as triethylaluminum, trimethylaluminum, tri-isobutylalumninum and tri-n-hexylaluminum and diethyl aluminum chloride, dibutyl zinc and the like. By "essentially free", it is meant that these compounds are not deliberately added to the reactor or any reactor components, and if present, are present to less than 1 ppm in the reactor.

One or all of the catalysts can be combined with up to 10 wt % of a metal-fatty acid compound, such as, for example, an aluminum stearate, based upon the weight of the catalyst system (or its components), such as disclosed in U.S. Pat. Nos. 6,300,436 and 5,283,278. Other suitable metals include other Group 2 and Group 5–13 metals. In an alternate embodiment, a solution of the metal-fatty acid compound is fed into the reactor. In yet another embodiment, the metal-fatty acid compound is mixed with the catalyst and fed into the reactor separately. These agents may be mixed with the catalyst or may be fed into the reactor in a solution or a slurry with or without the catalyst system or its components.

Supported catalyst(s) can be combined with the activators and are combined, such as by tumbling and other suitable means, with up to 2.5 wt % (by weight of the catalyst composition) of an antistatic agent, such as an ethoxylated or methoxylated amine, an example of which is Kemamine AS-990 (ICI Specialties, Bloomington Del.).

EXAMPLES

The following examples discuss some properties and other characteristics of bimodal polyethylene compositions that have, among other things, a high "spread," and also surprisingly high stress performance properties when subjected to internal pipe resistance, meeting and even surpassing PE-100 requirements.

Example 1

A bimodal polyethylene resin product, henceforth referred to as the "Bimodal Product," was produced using gas phase polymerization in a single-reactor system with a spray-dried catalyst system that included bis(2-(trimethylphenylamido) ethyl)amine zirconium dibenzyl together with pentamethylcyclopentadienyl, n-propylcyclopentadienyl zirconium dichloride in a 2.3:1 molar ratio. Also fed to the reactor was MMAO, a modified methylalumoxane. A "dry mode" was utilized, meaning that the material was introduced in the form of dry powder (granules). The resulting Bimodal Product samples had an FI of 5–7; a density ranging from 0.946 to 0.947; and MFR of approximately 200. Representative reactor conditions for the product were: C2 partial pressure=220 psi; Temperature=85° C.; H2/C2 =0.0035; C6/C2=0.005; Bed weight=115 lbs.; Fluidized bulk density=13–19 lb/ft3; SGV=2 to 2.15 ft/s; Dew point=55 to 60° C.; IC5=10 to 12%.

Resin Properties

Compounded granular samples of Bimodal Product resin were prepared, on Prodex compounding line equipped with 2.5 inch single screw with two Maddock mixing heads, using compounding additives, namely, 2,000 ppm of B-225 (Irganox 1010 and Irgafos 168 in a 1:1 ratio) and 1,000 ppm of CaSt. The resulting pellet samples were measured for flow properties, density, and Size Exclusion Chromatography (SEC), as discussed below.

Table 1 presents flow properties of two samples of Bimodal Product. Sample 1 was a Bimodal Product compounded without carbon black, a natural grade (NG) bimodal product produced from a dry catalyst system (identified above). Sample 2 was a bimodal product that included black compounds but was otherwise identical to Sample 1. The black compounds were masterbatches containing carbon black. Note that addition of black compounds had little impact on the overall flow properties, but density increased about 0.01 g/cc and resulted in a density of approximately 0.9592 g/cc.

TABLE 1

| Sample number | FI ($I_{21}$) | MI ($I_2$) | MFR ($I_{21}/I_2$) | Density (g/cc) |
|---|---|---|---|---|
| 1 | 7.94 | 0.04 | 200 | 0.9494 |
| 1 with carbon black | 7.95 | 0.04 | 199 | 0.9592 |

Molecular Characteristics

FIG. 1 shows a molecular weight distribution (MWD) curve taken of the Bimodal Product (sample 1) using the SEC technique described herein (GPC method), which reveals two peaks, one of which corresponds to a relatively low molecular weight component, the other corresponding to a high molecular weight component. Table 2 below shows molecular data from SEC and its deconvolution results for sample 1. The overall Mw (of the Bimodal Product, sample 1) was approximately 316,000 and the overall Mn was approximately 8,800. Overall polydispersity (PDI) was 35.8. The HMW component (with $Mw_{HMW}$) was 53 wt %, and the PDI of the HMW component was 4.9. The "spread," i.e., the ratio of $Mw_{HMW}$ to $Mw_{LMW}$, was 50.

TABLE 2

| Sample: | 1 |
|---|---|
| Exp. Mn: | 8,809 |
| Exp. Mw: | 315,675 |
| Exp. Mw/Mn: | 35.84 |
| LMW Mn: | 4,023 |
| LMW Mw: | 11,727 |
| LMW Mw/Mn: | 2.92 |
| LMW Wt %: | 47.09% |
| HMW Mn: | 119,484 |
| HMW Mw: | 586,787 |
| HMW Mw/Mn: | 4.91 |
| HMW Wt %: | 52.91% |
| $Mw_{HMW}/Mw_{LMW}$ | 50.04 |

PENT Performance

Test specimens of specific dimensions for Pennsylvania notch test (PENT) and Charpy impact test were prepared for sample 1. PENT is a lab-scale screening test with small specimens to predict the resistance of slow crack growth of pipes or long term hydrostatic strength test per ISO 1167. This laboratory test was originally developed by Prof. Brown at Pennsylvania University and now adopted as ASTM standard (F1473–94). Internal criterion of PE-100 material is to pass 150 hrs at 3.0 MPa at 80° C. in PENT. Samples of the Bimodal Product, in pellet resin form, were compression molded to make plaques for PENT in accordance with the ASTM standard. From the plaques, three rectangular specimens were milled, cut and then placed onto PENT test stations.

Two out of three specimens made from the same Bimodal Product sample 1 lasted 1,638 hours and 1,964 hours. The third specimen of Bimodal Product sample 1, conducted using a different PENT station, and also a different operator, lasted 5,700 hours.

Pipe Extrusion Testing

Then, pipes were extruded for purposes of a long-term hydrostatic test in an external test laboratory. A compounded pellet resin was premixed with black masterbatch (DFNF-0092) at a level of 6.5% before it was added to the hopper of the pipe extruder. The molten pipe profile coming out of an annular die was drawn down from the die-gap opening into the interior of the sizing sleeve by a puller located further downstream. As pipe moved through the sizing sleeve, a vacuum pulled the molten profile against the interior of the sleeve. Cooling water entered the compartment, cooling the pipe and maintaining established dimensions. Nominal 32mm SDR 11 pipes of high quality with smooth surface were produced.

Short Term Hydrostatic Strength Tests of Pipes

Standardized internal pressure tests for plastic pipe are set forth in ISO 1167 entitled "Thermoplastic pipes for the conveyance of fluids—Resistance to internal pressure—Test method." The test specifies a method for determination of the resistance to constant internal pressure at constant temperature. The test requires that samples be kept in an environment at a specific temperature, which can be water ("water-in-water" test), another liquid ("water-in-liquid") or air ("water-in-air" test).

Before a full hydrostatic test was performed, with all the required number of pipe specimens at three different temperatures and under well-distributed pressures, a "preliminary check points test" was performed, as described in ISO 4437 following ISO 1167. This test is a short-term screening hydrostatic pressure test being conducted at three specific hydrostatic conditions. ISO 4437 specifies three specific criteria for PE-80 and PE-100 resins. The tests were performed on 32 mm SDR 11 pipes (3 mm thickness) as "water-in-water" test. In terms of pipe length, the standard requires at least three times the outside diameter. In our case, the length of pipe was 350 mm.

Pipe specimens made from Bimodal Product (sample 1, which includes carbon black, called sample 1bk hereafter) were subjected to the three conditions required for PE-100. Table 3 reveals the test results for short-term hydrostatic strength tests as described in ISO 4437 following ISO 1167 for pipe specimens made from sample 1 bk.

TABLE 3

| Pipe Specimen numbers | Temp ° C. | Hydrostatic pressure (Mpa) | Failure time (Hour) | Requirements on failure time | Test parameters for PE-100 pipe resin |
|---|---|---|---|---|---|
| 1 | 20 | 12.46 | 221 | ≧100 | @ 20° C. and 12.4 MPa |
| 2 | 20 | 12.40 | 222 | ≧100 | @ 20° C. and 12.4 MPa |
| 3 | 80 | 5.53 | 204 | ≧165 | @ 80° C. and 5.5 Mpa |
| 4 | 80 | 5.03 | >12,192 | >1,000 | @ 80° C. and 5.0 MPa |
| 5 | 80 | 5.03 | 10,637 | >1,000 | @ 80° C. and 5.0 MPa |
| 6 | 80 | 5.51 | 227 | ≧165 | @ 80° C. and 5.5 Mpa |
| 7 | 80 | 5.50 | 643 | ≧165 | @ 80° C. and 5.5 Mpa |

It should be noted that, for all the cases, sample 1 bk far exceeded the failure-time criteria for PE-100 that is specified in ISO 4437. Full hydrostatic strength test following ISO 1167:1996

After the short term hydrostatic strength test, a full hydrostatic pressure testing following ISO 1167 was conducted. Deionized water was used on the inside and on the outside of the pipe specimens. The accuracy of the temperature and the pressure were maintained at ±1 oC and +2/−1%, respectively. The measurements of the wall thickness were accurate within ±0.01 mm and the diameters within ±0.1 mm. The results obtained from the pressure testing of black pipes from sample 1 bk are given in Table 4. A total of 128 pipe specimens were subjected to different pressures and at three different temperatures.

The results were followed by standard extrapolation method (SEM) evaluation according to ISO 9080:2003(E). Multiple linear regression analysis was performed using creep rupture data by using a computer program delivered by Becetel, SEM V 1.15.

The selected analysis yielded the following strength values corresponding to 50 years at 20° C. and to the extrapolation time limit at 20 (100 years), 60, and 80° C. According to ISO 12162:1995(E) is the sample 1 bk classified PE 100 as its LPL value of 10.807 at 20° C. and 50 years exceeded a minimum required stress (MRS) of 10 MPa. In addition, the extrapolation results validated the sample 1 bk as MRS 10 for 100 years of service. Its LPL value at 20° C. and 100 years was 10.703, which exceeded 10 MPa. Table 4 summarizes the extrapolated strength values at selected time and temperatures for a full hydrostatic strength test with pipe specimens made from sample 1 bk.

TABLE 4

| | | Extrapolated strength values | |
|---|---|---|---|
| Temp. ° C. | Time Years | LPL MPa | LTHS MPa |
| 20 | 50.0 | 10.807 | 11.0 |
| 20 | 100.0 | 10.703 | 10.897 |
| 60 | 6.0 | 6.631 | 6.780 |
| 0 | 1.0 | 5.044 | 5.169 |

Example 2

Another bimodal polyethylene resin product (Sample 2) was produced using gas phase polymerization in a single-reactor system with a catalyst system that included, this time, (bis(2-(pentamethylphenylamido)ethyl)amine zirconium dibenzyl together with pentamethylcyclopentadienyl, n-propylcyclopentadienyl zirconium dichloride at molar ratio of 5.0. This time, the catalyst system was formulated in slurry form. A fumed silica is pretreated with MAO (methalumoxane) to form a supported MAO cocatalyst. The (bis(2-pentamethylphenylamido) ethyl)amine zirconium dibenzyl) and the {(pentamethylcyclopentadienyl)(n-propylcyclopentadienyl)zirconium dichloride)} metallocene were immobilized on the supported MAO. This is accomplished by a "spray drying" process, whereby the HN5 and metallocene are mixed in a hydrocarbon solvent (hexane or toluene) with the supported MAO, the liquid suspension mixture is then forced through a nozzle to form a vapor that causes the solvent to evaporate, leaving the dried supported catalyst composition.

The spray dried catalyst composition is suspended in a mineral oil and hexane mixture for injection into the reactor fluidized bed. The catalyst composition is at about 28 wt %; 62 wt % mineral oil; 10 wt % hexane. The material is injected through a nozzle that extends into the reactor about 2–4 ft using nitrogen pressure with some isopentane. Typical reactor conditions were: temperature at from 85° C. to 100° C., hexene comonomer of about 0.007 ($C_6$:$C_2$); 0.0035 $H_2$:$C_2$ level.

Thus produced granular resin was compounded as described in example 1. Resin properties, molecular data from SEC and its deconvolution, and PENT test results are shown in Table 5.

The FI was 7.7 and MFR was 237. Note that spread of this bimodal product was as high as 95, one of the highest among many other products. In the PENT test, the specimen lasted 2,607 hrs at 3.0 MPa at 80° C. before getting removed from the test station. Nominal 32 mm SDR 11 black pipe specimens were produced with sample 2 following the same procedure described in Example 1 and subjected to a short-term hydrostatic strength test as described in ISO 4437 following ISO 1167. It passed the PE-100 criteria described in Table 3.

TABLE 5

| Sample Number | 2 |
|---|---|
| FI, I21 | 7.71 |
| MI, I2 | 0.033 |
| MFR, I21/I2 | 237.6 |
| Density | 0.9491 |
| Exp. Mn: | 4,484 |
| Exp. Mw: | 394,965 |
| Exp. Mw/Mn: | 88.08 |
| LMW Mn: | 2,246 |
| LMW Mw: | 7,878 |
| LMW Mw/Mn: | 3.51 |
| LMW Wt %: | 47.43% |
| HMW Mn: | 130,767 |
| HMW Mw: | 747,536 |
| HMW Mw/Mn: | 5.72 |
| HMW Wt %: | 52.57% |
| $MW_{HMW}/MW_{LMW}$ | 94.89 |
| PENT (hrs) | >2,607 |

Examples 3–10

Additional bimodal HDPE products (Sample 3–10) were produced with the same catalyst used in Example 2 at either the same or slightly different molar ratios and, at the same or slightly different reactor conditions, as shown in Table 6. The FI of all the products fell between 6.0 and 11 with their MFR as low as 80 and as high as 220. The split, i.e., the weight % of high molecular weight in the compostion, was above 50% for all the products. Notably above all, the spread of all the products was higher than 30, or higher than 40. All of the specimens made therefrom exhibited excellent results in the PENT test. Some of them lasted more than 2,000 hours, or more than 3,000 hours, or more than 4,000 hours, or even 5,000 hours before they were removed from the stations. Table 6 shows data on resin properties and molecular weight for all the bimodal HDPEs produced.

Black pipe specimens (nominal 32 mm SDR 11) made from sample 3 (9.0FI, 0.9494D, split: 51.4%, spread: 60.4, PENT hours: >2,064) were also subjected to the short term hydrostatic strength test as described in ISO 4437 following ISO 1167, whose results satisfied all the requirements for PE- 100.

TABLE 6

| | Sample numbers | | | | | | | |
|---|---|---|---|---|---|---|---|---|
| | 3 | 4 | 5 | 6 | 7 | 8 | 9 | 10 |
| FI, I21 | 8.95 | 8.47 | 10.1 | 8.67 | 7.25 | 6.18 | 9.46 | 9 |
| MI, I2 | 0.052 | 0.039 | 0.059 | 0.062 | 0.058 | 0.06 | 0.105 | 0.065 |
| MFR, I21/I2 | 172.8 | 218 | 169 | 139.6 | 124.9 | 103 | 83.3 | 139.6 |
| Density | 0.9494 | 0.9489 | 0.9498 | 0.9506 | 0.9503 | 0.9459 | 0.9475 | 0.9506 |
| Exp. Mn: | 7,460 | 7,304 | 8,899 | 7,507 | 8,175 | 4,690 | 4,623 | 5,714 |
| Exp. Mw: | 296,565 | 333,556 | 257,808 | 317,402 | 315,950 | 277,321 | 245,940 | 276,543 |
| Exp. Mw/Mn: | 39.76 | 45.67 | 28.97 | 42.28 | 38.65 | 59.13 | 53.20 | 48.40 |
| LMW Mn: | 3,404 | 3,405 | 3,810 | 3,282 | 3,593 | 2,006 | 2,030 | 2,646 |
| LMW Mw: | 9,350 | 10,782 | 10,626 | 9,177 | 9,713 | 7,924 | 6,008 | 7,763 |
| LMW Mw/Mn: | 2.75 | 3.17 | 2.79 | 2.80 | 2.70 | 3.95 | 2.96 | 2.93 |
| LMW Wt %: | 48.57 | 46.58 | 45.49 | 46.89 | 46.84 | 44.36 | 43.01 | 47.13 |
| HMW Mn: | 125,381 | 128,750 | 136,573 | 131,406 | 136,575 | 112,357 | 99,467 | 122,181 |
| HMW Mw: | 564,816 | 616,116 | 465,209 | 589,548 | 587,216 | 490,171 | 424,268 | 519,067 |
| HMW Mw/Mn: | 4.50 | 4.79 | 3.41 | 4.49 | 4.30 | 4.36 | 4.27 | 4.25 |
| HMW Wt %: | 51.43 | 53.42 | 54.51 | 53.11 | 53.16 | 55.64 | 56.99 | 52.87 |
| $Mw_{HMW}/Mw_{LMW}$ | 60.41 | 57.14 | 43.78 | 64.24 | 60.46 | 61.86 | 70.62 | 66.86 |
| PENT (hrs) | >2,064 | >3,448 | >3,816 | >4,526 | >4,526 | >5,033 | >4,342 | 2,735 |

What is claimed is:

1. A high strength bimodal polyethylene composition having a density of 0.940 g/cc or more and an overall PDI of 35 or more, the composition comprising a high molecular weight polyethylene component and a low molecular weight polyethylene component, wherein:
   the ratio of the weight average molecular weight of high molecular weight component to the weight average molecular weight of low molecular weight component ($Mw_{HMW}$:$Mw_{LMW}$) is 30 or more; and
   the composition qualities as a PB 100 material such that in accordance with ISO 1167 a pipe formed from the composition that is subjected to internal pipe resistance has an extrapolated stress of 10 MPa or more when the internal pipe resistance curve is extrapolated to 50 or 100 years in accordance with ISO 9080:2003(E).

2. The composition of claim 1 in which the high molecular weight polyethylene component has a density of 0.945 or less.

3. The composition of claim 1 in which the low molecular weight polyethylene component has a density of 0.940 or more.

4. The composition of claim 1 in which the average molecular weight (Mw) of the low molecular weight polyethylene component is from 5,000 to 30,000.

5. The composition of claim 1 in which the average molecular weight (Mw) of the high molecular weight polyethylene component is from 300,000 to 800,000.

6. The composition of claim 1 in which the high molecular weight polyethylene component includes a polyethylene that includes a comonomer selected from the group consisting of butene, hexene and octene, wherein the comonomer is present in the amount of more than 1.0 wt% of the polyethylene.

7. The composition of claim 1 in which the low molecular weight polyethylene component includes a polyethylene that includes a comonomer selected from the group consisting of butene, bexene and octene, wherein the comonomer is present in the amount of less than 3.0 wt% of the polyethylene.

8. The composition of claim 1 wherein the extrapolated stress is 10.5 MPa or more when extrapolated to 50 or 100 years in accordance with ISO 9080:2003(E).

9. The composition of claim 1 wherein the high molecular weight polyethylene component is present in the amount of 50 wt % or more of the composition.

10. The composition of claim 1 wherein the FI ($I_{21}$) of the composition is from 5 to 12 g/10 min.

11. The composition of claim 1 having an MFR ($I_{21}/I_2$) of from 80 to 250.

12. The composition of claim 1 wherein the PDI of the high molecular weight component is greater than 3.0.

13. The composition of claim 1 wherein the PDI of the low molecular weight component is 2.5 or more.

14. The composition of claim 1 wherein the average molecular weight of the overall composition is 250,000 or more.

15. The composition of claim 1 wherein the high and low molecular weight polyethylene components are formed in a single reactor.

16. The composition of claim 1 wherein the high and low molecular weight polyethylene components are formed in separate reactors.

17. The composition of claim 1 wherein the composition is a physical blend of high and low molecular weight polyethylene components that are formed in separate reactors and then blended together after formation.

18. The composition of claim 1 wherein the high and low molecular weight polyethylene components are formed in gas phase polymerization.

19. The composition of claim 1 wherein the high and low molecular weight polyethylene components are formed in slurry phase polymerization.

20. The composition of claim 1 wherein the composition is made from polymerization conducted in the presence of a multiple catalyst system that includes a metallocene based catalyst.

21. The composition of claim 1 wherein the high and low molecular weight polyethylene components are formed from polymerization conducted in the presence of a multiple catalyst system that includes bis(2-trymethylphenylamido)ethyl)amine zirconium dibenzyl.

22. The composition of claim 1 wherein the high and low molecular weight polyethylene components are formed from polymerization conducted in the presence of a multiple catalyst system that includes bis(2-(pentamethyl-phenylamido)ethyl)amine zirconium dibenzyl.

23. The composition of claim 1 wherein the high and low molecular weight polyethylene components are formed from polymerization conducted in the presence of a multiple catalyst system that includes pentamethylcyclopentadienyl, n-propylcyclopentadienyl zirconium dichoride.

24. The composition of claim 1, wherein the $MW_{HMW}:MW_{LMW}$ is 40 or more.

* * * * *

UNITED STATES PATENT AND TRADEMARK OFFICE
CERTIFICATE OF CORRECTION

PATENT NO. : 7,193,017 B2
APPLICATION NO. : 10/918190
DATED : March 20, 2007
INVENTOR(S) : Kwalk It is certified that error appears in the above-identified patent and that said Letters Patent is hereby corrected as shown below:

Claim 1, line 58, "PB 100" should read -- PE 100 --.

Signed and Sealed this

Twenty-second Day of May, 2007

JON W. DUDAS
*Director of the United States Patent and Trademark Office*